United States Patent
Watanabe et al.

(10) Patent No.: US 9,695,497 B2
(45) Date of Patent: Jul. 4, 2017

(54) METHOD FOR FINISHING WORK OF SPRAY-COATED SURFACE AND WORKING TOOL

(71) Applicant: NISSAN MOTOR CO., LTD., Kanagawa (JP)

(72) Inventors: Takafumi Watanabe, Chigasaki (JP); Masatoshi Inoguchi, Isehara (JP); Kiyokazu Sugiyama, Chigasaki (JP); Daisuke Terada, Yokohama (JP); Yoshitsugu Noshi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 273 days.

(21) Appl. No.: 14/382,941

(22) PCT Filed: Feb. 28, 2013

(86) PCT No.: PCT/JP2013/055371
§ 371 (c)(1),
(2) Date: Sep. 4, 2014

(87) PCT Pub. No.: WO2013/133118
PCT Pub. Date: Sep. 12, 2013

(65) Prior Publication Data
US 2015/0044385 A1 Feb. 12, 2015

(30) Foreign Application Priority Data

Mar. 6, 2012 (JP) .................. 2012-049068
Mar. 6, 2012 (JP) .................. 2012-049069

(51) Int. Cl.
*C23C 4/02* (2006.01)
*C23C 4/12* (2016.01)
(Continued)

(52) U.S. Cl.
CPC .............. *C23C 4/18* (2013.01); *B05D 1/08* (2013.01); *B05D 3/007* (2013.01); *B05D 3/12* (2013.01);
(Continued)

(58) Field of Classification Search
CPC .. C23C 4/18; B05D 1/08; B05D 3/007; B05D 3/12; B23B 29/02; B23B 41/12; B23B 51/02; B23B 2215/242; B23B 2226/125
(Continued)

(56) References Cited

U.S. PATENT DOCUMENTS 6,746,550 B1 * 6/2004 Hollinger ................ C22C 37/10
148/321
7,621,250 B2 11/2009 Iizumi et al.
(Continued)

FOREIGN PATENT DOCUMENTS

CN 101016613 A 8/2007
CN 102189280 A 9/2011
(Continued)

OTHER PUBLICATIONS

Definition of "helix" from http://www.oed.com, retrieved Feb. 4, 2016, 2 pgs.*
(Continued)

*Primary Examiner* — William Phillip Fletcher, III
(74) *Attorney, Agent, or Firm* — Young Basile Hanlon & MacFarlane, P.C.

(57) ABSTRACT

In a method for a finishing work of a spray-coated surface, an inner surface of a cylindrical hollow member is roughened by forming a helical groove thereon. A thermal spray coating is formed on the inner surface that is roughened, and a finishing work is carried out by cutting the thermal spray coating along a helix of the groove by use of a cutting tool. According to the method for a finishing work, a finishing (Continued)

work of a thermal spray coating with non-uniform hardness can be carried out efficiently.

14 Claims, 5 Drawing Sheets

(51) Int. Cl.
| | |
|---|---|
| C23C 4/18 | (2006.01) |
| B23B 27/00 | (2006.01) |
| B23B 27/02 | (2006.01) |
| B23B 41/00 | (2006.01) |
| B23B 41/12 | (2006.01) |
| B05D 1/08 | (2006.01) |
| B05D 3/12 | (2006.01) |
| B05D 3/00 | (2006.01) |
| B23B 29/02 | (2006.01) |
| B23B 51/02 | (2006.01) |
| C23C 4/16 | (2016.01) |
| B05B 13/06 | (2006.01) |

(52) U.S. Cl.
CPC ............. *B23B 29/02* (2013.01); *B23B 41/12* (2013.01); *B23B 51/02* (2013.01); *C23C 4/02* (2013.01); *C23C 4/16* (2013.01); *B05B 13/0636* (2013.01); *B23B 2215/242* (2013.01); *B23B 2226/125* (2013.01); *Y10T 408/909* (2015.01)

(58) Field of Classification Search
USPC ....... 427/230, 236, 237, 239, 290, 327, 356, 427/357, 367, 446, 455, 456, 448; 408/24, 199, 227
See application file for complete search history.

(56) References Cited

U.S. PATENT DOCUMENTS

| | | | |
|---|---|---|---|
| 8,747,034 B2 | 6/2014 | Stadelmann et al. | |
| 9,109,276 B2 | 8/2015 | Kanai et al. | |
| 2007/0190272 A1* | 8/2007 | Kanai | C23C 4/124 428/34.1 |
| 2008/0245226 A1* | 10/2008 | Iizumi | B23B 27/06 92/169.1 |
| 2008/0245227 A1* | 10/2008 | Iizumi | B23B 27/007 92/169.1 |
| 2008/0260958 A1* | 10/2008 | Sekikawa | B23P 9/02 427/448 |
| 2009/0029060 A1 | 1/2009 | Kanai et al. | |
| 2011/0000085 A1 | 1/2011 | Kanai et al. | |
| 2011/0222979 A1 | 9/2011 | Stadelmann et al. | |
| 2015/0151369 A1* | 6/2015 | Gand | B23B 27/06 409/244 |

FOREIGN PATENT DOCUMENTS

| | | |
|---|---|---|
| EP | 1 820 874 A2 | 8/2007 |
| JP | 58-28404 A | 2/1983 |
| JP | 2006159389 A | 6/2006 |
| JP | 2007211307 A | 8/2007 |
| JP | 2008221445 A | 9/2008 |
| JP | 2009052132 A | 3/2009 |
| WO | 2006061695 A1 | 6/2006 |
| WO | WO 2006/061695 A1 * | 6/2006 |
| WO | 2010046754 A1 | 4/2010 |

OTHER PUBLICATIONS

Bobzin et al., "Thermal spraying of cylinder bores with the Plasma Transferred Wire Arc Process," Surface & Coatings Technology 202 (2008) 4438-4443.*

Extended European Search Report dated Feb. 23, 2015 from corresponding European Application No. 13757403.4.

* cited by examiner

METHOD FOR FINISHING WORK OF SPRAY-COATED SURFACE AND WORKING TOOL

CROSS REFERENCE TO RELATED APPLICATIONS

The present application claims priority to Japanese Patent Application Nos. 2012-049068, filed Mar. 6, 2012, and 2012-049069, filed Mar. 6, 2012, each incorporated herein in its entirety.

TECHNICAL FIELD

The present invention relates to a method for a finishing work of a spray-coated surface in which the finishing work is carried out to a thermal spray coating formed on a roughened inner surface of a cylindrical hollow member, and relates to a tool therefor.

BACKGROUND

Known is a technique for forming a thermal spray coating by spraying molten metal onto a cylinder-bore inner surface in a cylinder block of an internal combustion engine. Adherence of the thermal spray coating onto the cylinder-bore inner surface can be strengthened by roughening the cylinder-bore inner surface before forming the thermal spray coating.

Japanese Unexamined Patent Publication No. 2007-211307 discloses a surface roughening work of a cylinder-bore inner surface. In the surface roughening work, a helical groove is formed on the inner surface by use of a cutting tool. By such a surface roughening work by use of a cutting tool, it becomes possible to strengthen adherence of a thermal spray coating more than by other surface roughening works such as shot-blasting. In addition, it also discloses that a horning work is done as a finishing work for a spray-coated surface.

SUMMARY OF INVENTION

On the roughened surface on which the helical groove is formed, a depressed portion corresponding to a root of an inner screw thread and a protruded portion corresponding to a crest thereof are formed. In addition, generally, a thermal spray coating is formed by spraying molten metal from a nozzle of a spray-coating gun. At the time, the molten metal is sprayed from the nozzle onto the roughened surface while the spray-coating gun is rotated and moved in an axial direction Especially, surrounding air tends to be caught up when spraying the molten metal onto the protruded portion. The molten metal (made of iron-based metal material) is oxidized by the caught-up air, and thereby a thermal spray coating on the protruded portion tends to have higher hardness than that of a thermal spray coating on the depressed portion. Namely, in the thermal spray coating, a high hardness portion on the protruded portion and a low hardness portion on the depressed portion exist mixedly. The high hardness portion and the low hardness portion are helically formed, respectively. However, working efficiency becomes bad if a finishing work (honing work) is merely carried out to the thermal spray coating in which the high hardness portion and the low hardness portion exist mixedly.

An object of the present invention is to provide a method for a finishing work of a spray-coated surface for carrying out the finishing work to a thermal spray coating formed on a roughened inner surface of a cylindrical hollow member, and a tool therefor, each of which can efficiently carry out a finishing work to a spray-coated surface having non-uniform hardness.

A first aspect of the present invention provides a method for a finishing work of a spray-coated surface, the method comprising: roughening an inner surface of an cylindrical hollow member by forming helical groove thereon; forming a thermal spray coating on the inner surface that is roughened; and carrying out a finishing work by cutting the thermal spray coating along a helix of the groove by use of a cutting tool.

A second aspect of the present invention provides a tool for a finishing work of a spray-coated surface in which the finishing work is carried out by cutting a thermal spray coating formed on an inner surface of a cylindrical hollow member that has been roughened by forming a helical groove thereon, the tool comprising: a cutting tool that cuts the thermal spray coating along a helix of the groove; and a tool support member with which the cutting tool is fixed and that can be stroked, while being rotated, straightly in a direction of a rotary axis thereof.

DESCRIPTION OF EMBODIMENTS

Figure 1:
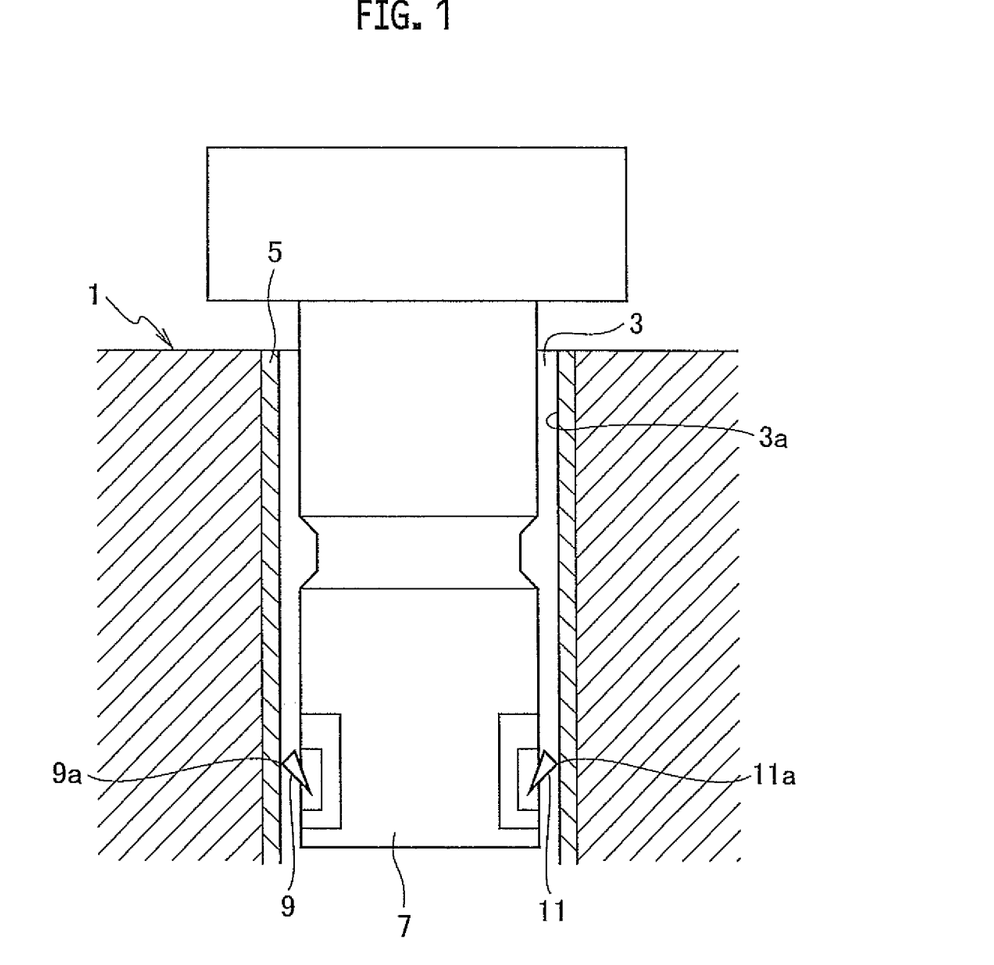
FIG. 1 is a side view showing a state where a thermal spray coating on a cylinder-bore inner surface is cut by a finishing work tool according to a first embodiment.

Hereinafter, embodiments will be explained with reference to the drawings. FIG. 1 shows a first embodiment of a work tool for a spray-coated surface (a method for a finishing work).

As shown in FIG. 1, a cylinder block (cylindrical hollow member) 1 of an internal combustion engine that is worked by the work tool of the present embodiment is made of aluminum alloy, and provided with one or more cylinder mores 3 (only one cylinder bore 3 is shown in FIG. 1). A thermal spray coating 5 made of iron-based metal material is formed on a cylinder-bore inner surface 3a of the cylinder bore 3. The work tool is provided with a boring bar (tool support member) 7 that can be stroked, while being rotated, straightly in a direction of its rotary axis, and a first cutting tool 9 and a second cutting tool 11 that are mounted on the boring bar 7.

The cutting tools 9 and 11 in the present embodiment are tip tool bits, and fixed at an end of the boring bar 7. As explained above, the thermal spray coating 5 includes the high hardness portion and the low hardness portion, and the first cutting tool 9 cuts the low hardness portion and the second cutting tool 11 cuts the high hardness portion during the finishing work. A rake edge 9a is provided at an end of the first cutting tool (tool tip bit) 9, and a rake edge 11a is provided at an end of the second cutting tool (tool tip bit) 11.

Figure 2A:
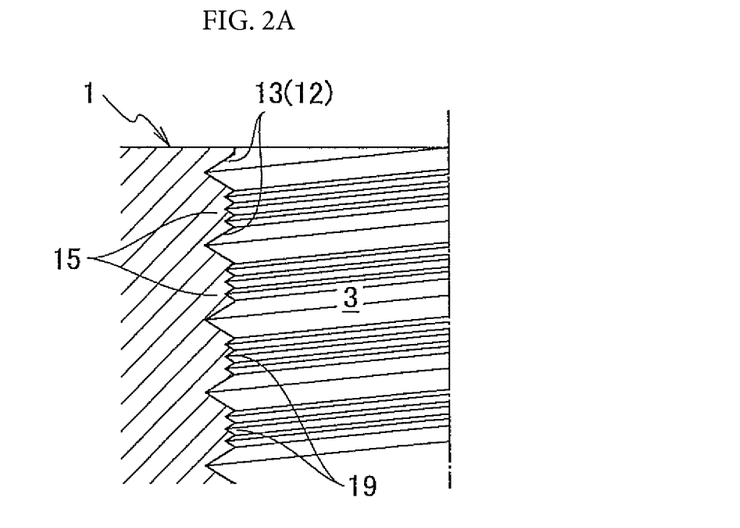
FIG. 2(a) is a cross-sectional view showing a roughened cylinder-bore inner surface before the thermal spray coating is formed.
Figure 3:
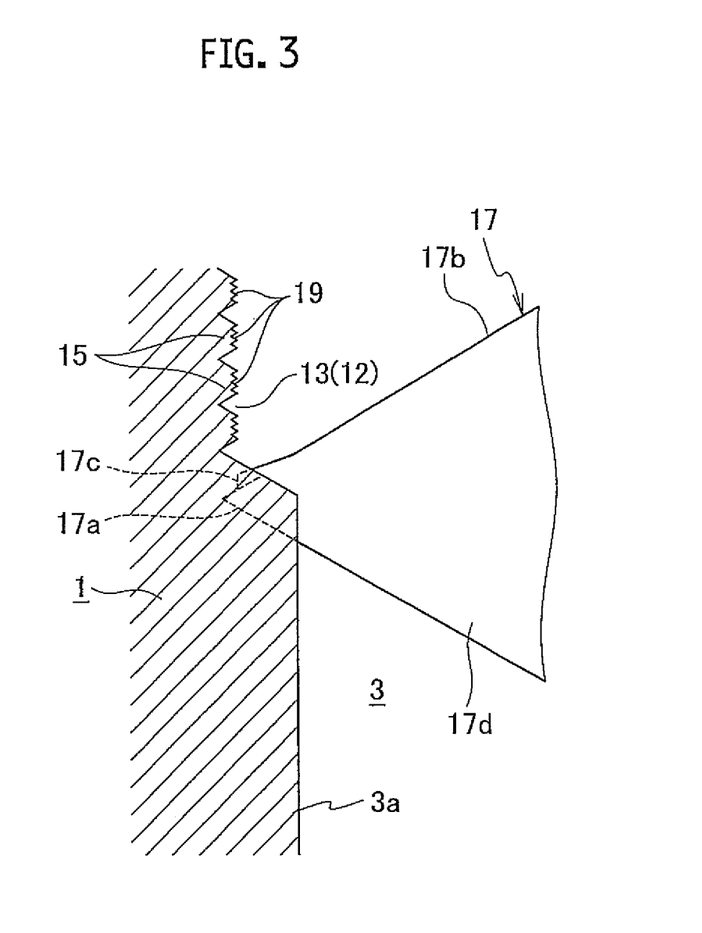
FIG. 3 is a cross-sectional view showing a state where a cylinder-bore inner surface is being roughened.

As show in FIG. 2(a), a cylinder-bore inner surface 3a before forming the thermal spray coating 5 is roughened by forming a helical groove 12. In the surface roughing work, the cylinder-bore inner surface 3a is cut by a cutting tool (see, a cutting tool 17 shown in FIG. 3) attached to a boring bar (not shown), so that the cylinder-bore inner surface 3a is roughened. At the time, a depressed portion 13 and a protruded portion 15 adjacent to the depressed portion 13 are formed by the helical groove 12. A ridge of the protruded portion 15 is fractured to form a fractural face 19 by using the cutting tool 17 for a surface roughening work as shown in FIG. 3. Adherence onto the thermal spray coating 5 can be improved by the fractural face 19.

The cutting tool 17 is the same as a cutting tool disclosed in a Publication No. 2006-159389 of a Japanese Patent Application filed by the present Applicant (International Publication WO2006/061695A1). The depressed portion 13 is formed by a rake edge 17a of the cutting tool 17. In addition, a projection 17c is formed on an inclined face 17b formed near the rake edge 17a. At the same time when (immediately after) the rake edge 17a forms the depressed portion 13, the inclined face 17b fractures the ridge of the protruded portion 15 to form the fractural face 19.

Figure 2B:
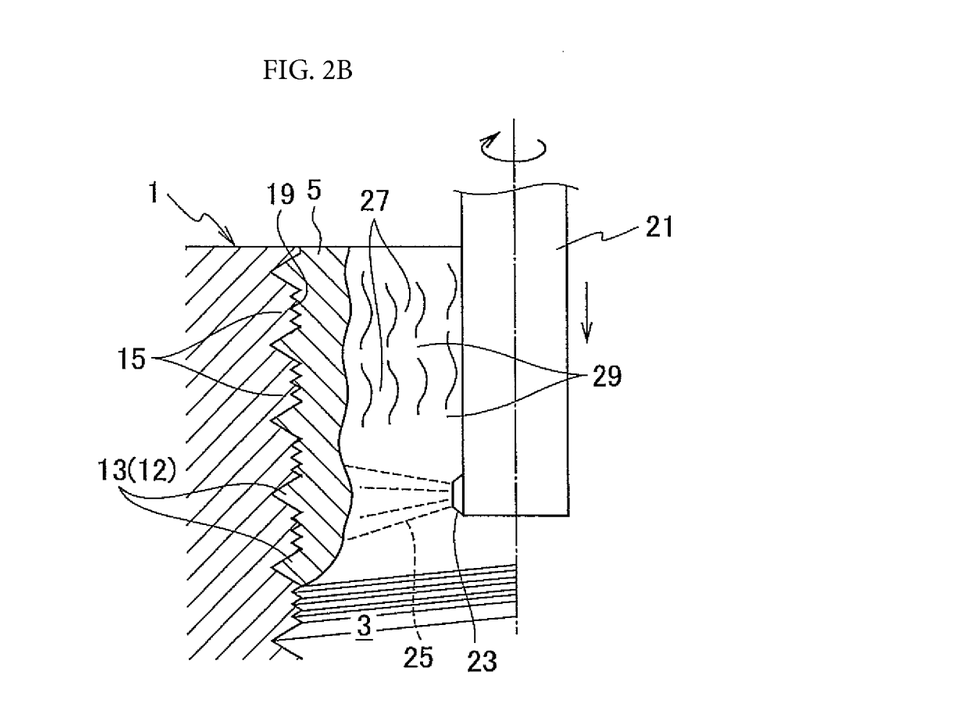
FIG. 2(b) is a cross-sectional view showing a state where the thermal spray coating is being formed on the roughened cylinder-bore inner surface.

The thermal spray coating 5 is formed by spraying molten metal from a spray-coating gun 21 shown in FIG. 2(b) onto the roughened surface composed of the depressed portion 13 and the protruded portion 15 (the fractural face 19). At the time, the spray-coating gun 21 sprays molten droplets 25 of the molten metal from its nozzle 23 while it is rotated about an axis line of the cylinder bore 3 and stroked in a direction of the axis line. The sprayed molten droplets 25 adhere on the cylinder-bore inner surface 3a, and thereby the thermal spray coating 5 is formed.

Especially, surrounding air tends to be caught up when spraying the molten droplets 25 to the protruded portion 15. The sprayed molten metal is oxidized by the caught-up air, and thereby the thermal spray coating 5 on the protruded portion 15 (the fractural face 19) has higher hardness than that of the thermal spray coating 5 on the depressed portion 13. Namely, in the thermal spray coating 5, a high hardness portion 27 on the protruded portion 15 and a low hardness portion 29 on the depressed portion 13 exist mixedly (see FIG. 2(b)). The high hardness portion 27 and the low hardness portion 29 are helically formed, respectively (namely, hardness of the thermal spray coating 5 possesses ununiformity). The hardness of the high hardness portion 27 becomes almost Hv=700, for example, and the hardness of the low hardness portion 29 becomes almost Hv=350, for example.

A finishing work is carried out to the thermal spray coating 5 formed as explained above by using the boring bar 7 shown in FIG. 1. The first cutting tool 9 for low hardness and the second cutting tool 11 for high hardness are mounted at the end of the boring bar 7. The first cutting tool 9 and the second cutting tool 11 are fixed with the boring bar 7 at positions that are 180-degree separated from each other about the rotary axis of the boring bar 7.

The first cutting tool 9 for low hardness is a CBN tool containing cBN (cubic boron nitride) particles not lower than 40% but lower than 90% at volume ratio. If the content percentage of the cBN particles is lower than 40%, wearing of the first cutting tool 9 may be accelerated when cutting the low hardness portion 29, and, if it is not lower than 90%, constituents of the low hardness portion 29 may adhere to the first cutting tool 9. On the other hand, the second cutting tool 11 for high hardness is a CBN tool containing cBN particles not lower than 85% at volume ratio. If the content percentage of the cBN particles is lower than 85%, wearing of the second cutting tool 11 may be accelerated when cutting the high hardness portion 27.

A surface of the thermal spray coating 5 is cut by stroking the boring bar 7 in the axis direction while rotating it. At the time, rotating speed and stroking speed of the boring bar 7 (i.e. the first cutting tool 9 and the second cutting tool 11) are adjusted so that the first cutting tool 9 cuts the low hardness portion 29 and the second cutting tool 11 cuts the high hardness portion 27. The rotating speed and the stroking speed are made equal to rotating speed and stroking speed of the cutting tool 17 (see FIG. 3) for the surface roughening work, and the rotating speed is 3000 rpm and the stroking speed is 0.25 mm/rev, for example. In addition, rotating direction of the boring bar 7 (i.e. the first cutting tool 9 and the second cutting tool 11) is also made identical to rotating direction of the cutting tool 17 (see FIG. 3) for the surface roughening work.

During the above-explained finishing work, the first cutting tool 9 is surely moved along a helix of the low hardness portion 29, and thereby the low hardness portion 29 can be cut accurately. Similarly, the second cutting tool 11 is surely moved along a helix of the high hardness portion 27, and thereby the high hardness portion 27 can be cut accurately. Namely, since the first cutting tool 9 continuously cuts the low hardness portion 29 that has hardness uniformity, working efficiency can be improved and its wearing can be also restricted. Similarly, since the second cutting tool 11 continuously cuts the high hardness portion 27 that has hardness uniformity, working efficiency can be improved and its wearing can be also restricted. Note that a honing work is carried out as a final finishing work after the above-explained finishing work.

Also note that the first cutting tool 9 and the second cutting tool 11 are fixed with the boring bar 7 at positions that are 180-degree separated from each other about the rotary axis of the boring bar 7 in the present embodiment. It is preferable that the first cutting tool 9 and the second cutting tool 11 are arranged so as to be 180-degree separated from each other, because their cutting resistances are balanced with each other. However, the first cutting tool 9 and the second cutting tool 11 may be arranged along the direction of the rotary axis (vertically in FIG. 1). In this case, a distance between the first cutting tool 9 and the second cutting tool 11 along the direction of the rotary axis is made identical to a distance between the depressed portion 13 and the protruded portion 15 shown in FIG. 2(a) (=a distance between the low hardness portion 29 and the high hardness portion 27). Namely, the distance between the first cutting tool 9 and the second cutting tool 11 along the direction of the rotary axis is made identical to half of a pitch of the helical groove 12.

According to the present embodiment, the thermal spray coating 5 is cut along the inside helix of the roughened surface in the finishing work, and, at the time, the low hardness portion 29 formed on the helical depressed portion 13 is continuously cut by the first cutting tool 9 and the high hardness portion 27 formed on the helical protruded portion 15 is continuously cut by the second cutting tool 11, so that the finishing work can be carried out efficiently.

In addition, according to the present embodiment, the low hardness portion 29 that has hardness uniformity is continuously cut by the first cutting tool 9, and the high hardness portion 27 that has hardness uniformity is continuously cut by the second cutting tool 11. Therefore, it becomes possible to cut cutting targets surely by the cutting tools (the first cutting tool 9 and the second cutting tool 11) that have adequate strength and adequate stiffness (hardness) for the cutting targets (the low hardness portion 29 and the high hardness portion 27) that have different hardness from each other, and thereby working efficiency can be improved. Further, it becomes possible to extend lives of the cutting tools, because wearing of the cutting tools can be restricted.

In addition, according to the present embodiment, since the first cutting tool 9 and the second cutting tool 11 are arranged so as to be 180-degree separated from each other, it becomes possible to cut the low hardness portion 29 by the first cutting tool 9 and cut the high hardness portion 27 by the second cutting tool 11. Further, since the resistance forces when cutting the cylinder-bore inner surface 3a are balanced, rotations of the boring bar 7 can become stable.

In addition, according to the present embodiment, since the first cutting tool 9 is a CBN tool containing cBN particles not lower than 40% but lower than 90% at volume ratio and the second cutting tool 11 is a CBN tool containing cBN particles not lower than 85% at volume ratio, it becomes possible to cut cutting targets surely by the cutting tools (the first cutting tool 9 and the second cutting tool 11) that have adequate strength and adequate stiffness (hardness) for the cutting targets (the low hardness portion 29 and the high hardness portion 27) that have different hardness from each other, and thereby working efficiency can be improved. Further, it becomes possible to extend lives of the cutting tools, because wearing of the cutting tools can be restricted.

In addition, according to the present embodiment, at least two conditions are made identical to each other among three conditions (1) rotating speed, rotating direction and stroking speed in an axis direction of the tool for forming the groove, (2) rotating speed, rotating direction and stroking speed in an axis direction of the spray-coating gun for forming the thermal spray coating, and (3) rotating speed, rotating direction and stroking speed in an axis direction of the first and second rotatable tool bits for the finishing work. As a result, the low hardness portion 29 and the high hardness portion 27 can be formed so as to be accurately coincident to the helixes of the depressed portion 13 and the protruded portion 15, respectively, and then the low hardness portion 29 and the high hardness portion 27 can be cut accurately by the first cutting tool 9 and the second cutting tool 11.

Note that, in the present embodiment, the first cutting tool 9 and the second cutting tool 11 are fixed with the boring bar 7. This it is preferable for the working efficiency, because it becomes possible to cut the low hardness portion 29 and the high hardness portion 27 simultaneously. However, it may be possible to continuously cut only the low hardness portion 29 by using a boring bar on which only the first cutting tool 9 is mounted and then continuously cut the high hardness portion 27 by using a boring bar on which only the second cutting tool 11 is mounted. Alternatively, it may be also possible to continuously cut only the high hardness portion 27 by using a boring bar on which only the second cutting tool 11 is mounted and then continuously cut the low hardness portion 29 by using a boring bar on which only the first cutting tool 9 is mounted.

Note that, although the roughened surface of the cylinder-bore inner surface 3a is composed of the depressed portion 13 and the protruded portion 15 (the fractural face 19) in the present embodiment, it is not limited to this configuration. For example, the roughened surface of the cylinder-bore inner surface 3a may be formed as a helical groove without the fractural face 19, like a mere inner screw thread. Namely, it is sufficient that the roughened surface of the cylinder-bore inner surface 3a is formed so as to have a helix.

Figure 4:
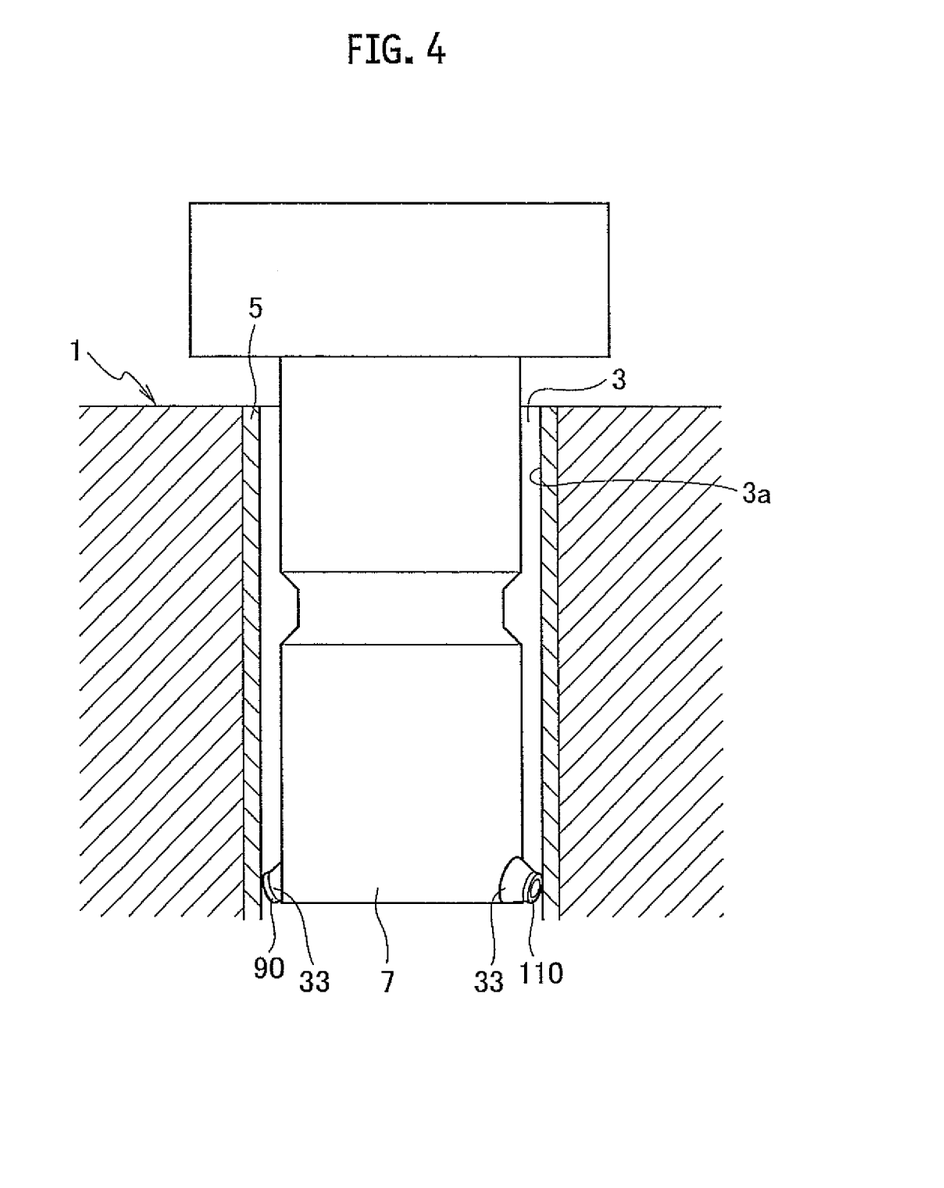
FIG. 4 is a side view showing a state where a thermal spray coating on a cylinder-bore inner surface is cut by a finishing work tool according to a second embodiment.

FIG. 4 shows a second embodiment of a work tool for a spray-coated surface (a method for a finishing work). Hereinafter, configurations equivalent or identical to those in the above-explained first embodiment will be labeled with identical numbers, and their detailed explanations will be omitted. In the present embodiment, a first cutting tool 90 is provided instead of the first cutting tool 9 in the first embodiment, and a second cutting tool 110 is provided instead of the second cutting tool 11 in the first embodiment.

Figure 5:
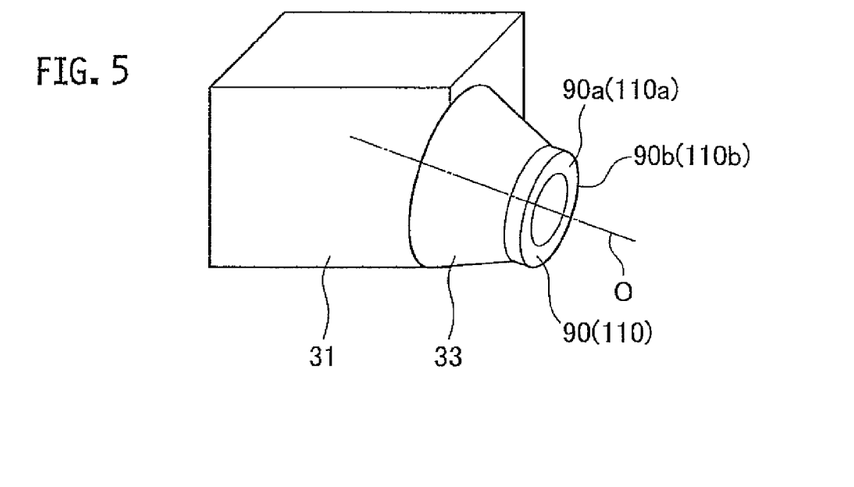
FIG. 5 is a schematic perspective view showing a rotatable tool bit of the tool shown in FIG. 4.

As shown in FIG. 4, the first cutting tool 90 in the present embodiment is a first rotatable tool bit 90, and the second cutting tool 110 is a second rotatable tool bit 110. The first rotatable tool bit 90 and the second rotatable tool bit 110 are mounted at an end of the boring bar 7 so as to be 180-degree separated from each other. As shown in FIG. 5, the first rotatable tool bit 90 (the second rotatable tool bit 110) is a throw-away type circular insert that is rotatably attached to a mount base 33 provided on a tool body 31 and rotates about an rotary axis O. The tool body 31 is attached to the boring bar 7 detachably, but it is not shown in FIG. 4.

A rake surface 90a (110a) of the first rotatable tool bit 90 (the second rotatable tool bit 110) has a rake angle inclined to the rotary axis of the boring bar 7. During cutting, a force component is generated at a ring-shaped rake edge 90b (110b) on a circumference of the rake surface 90a (110a) in relation to a main force component of a cutting resistance. Then, this force component applies in a tangential direction of the circumference to rotate a circular tip, so that cutting is made by the whole circumference of the ring-shaped rake edge 90b (110b). Note that material of the first rotatable tool bit 90 is identical to the above-explained material of the first cutting tool 9 in the first embodiment. Material of the second rotatable tool bit 110 is also identical to the above-explained material of the second cutting tool 11 in the first embodiment. In addition, the above-explained three working conditions (1) to (3) are also controlled similarly to those in the first embodiment.

The above-explained advantages brought by the first embodiment can be brought also by the present embodiment similarly. Further, according to the present embodiment, the low hardness portion 29 is cut by the first rotatable tool bit 90 and the high hardness portion 27 is cut by the second rotatable tool bit 110. Therefore, since the whole circumferences of the ring-shaped rake edges 90b and 110b are used during the finishing work and thereby wearing of them can be further restricted, it becomes possible to extend lives of the cutting tools further. As a result, working costs can be also reduced.

Note that, also in the second embodiment, it may be possible to continuously cut only the low hardness portion 29 by using a boring bar on which only the first rotatable tool bit 90 is mounted and then continuously cut the high hardness portion 27 by using a boring bar on which only the second rotatable tool bit 110 is mounted. Alternatively, it may be also possible to continuously cut only the high hardness portion 27 by using a boring bar on which only the second rotatable tool bit 110 is mounted and then continuously cut the low hardness portion 29 by using a boring bar on which only the first rotatable tool bit 90 is mounted.

Figure 6:
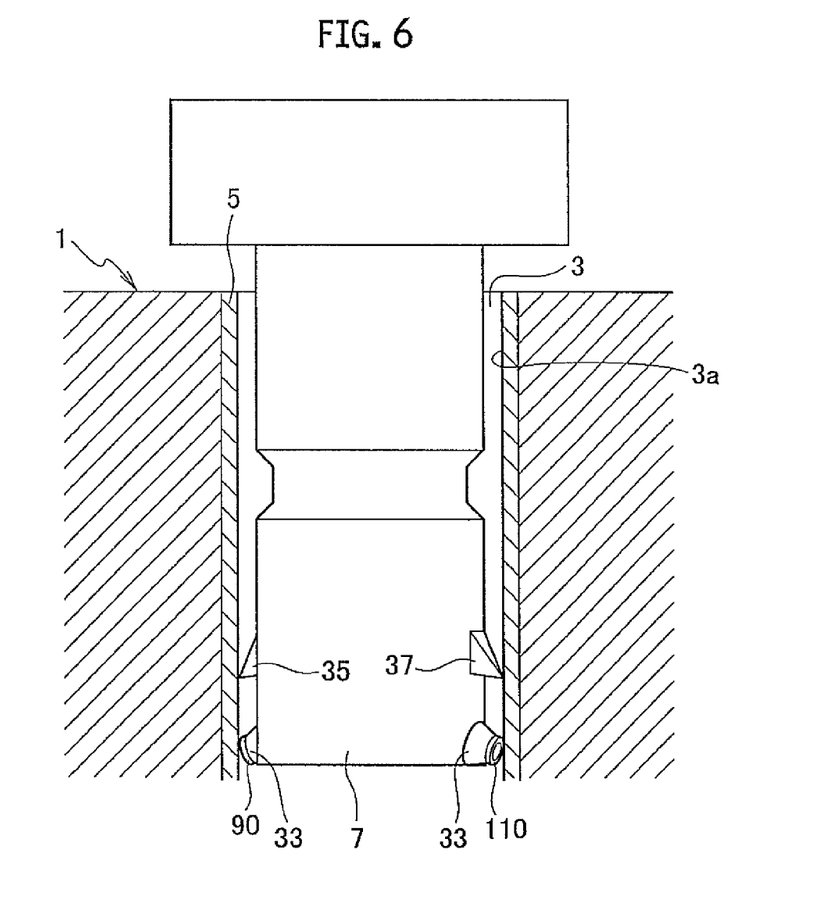
FIG. 6 is a side view showing a state where a thermal spray coating on a cylinder-bore inner surface is cut by a finishing work tool according to a third embodiment.

FIG. 6 shows a third embodiment of a work tool for a spray-coated surface (a method for a finishing work). Hereinafter, configurations equivalent or identical to those in the above-explained first and second embodiments will be labeled with identical numbers, and their detailed explanations will be omitted. In the present embodiment, to the working tool in the second embodiment, a first tip tool bit 35 and a second tip tool bit 37 for the finishing work are additionally fixed with the boring bar 7. The first tip tool bit 35 and the second tip tool bit 37 are fixed with the boring bar 7 so as to be 180-degree separated from each other.

The first tip tool bit 35 is made of material identical to that of the first cutting tool 9 in the first embodiment. A distance between the first tip tool bit 35 and the first rotatable tool bit 90 along the rotary axis of the boring bar 7 is made identical to the pitch of the depressed portion 13 (the low hardness portion 29). Here, the first tip tool bit 35 is located on a following side from the first rotatable tool bit 90 in a stroke direction of the working tool. Similarly, the second tip tool bit 37 is made of material identical to that of the second cutting tool 11 in the first embodiment. A distance between the second tip tool bit 37 and the second rotatable tool bit 110 along the rotary axis of the boring bar 7 is made identical to the pitch of the protruded portion 15 (the high hardness portion 27). Here, the second tip tool bit 37 is located on a following side from the second rotatable tool bit 110 in the stroke direction of the working tool. Note that it is not required, even if it is located on following side, that the first tip tool bit 35 and the first rotatable tool bit 90 are positionally coincide with each other when viewed along the direction of the rotary axis of the boring bar 7. Similarly, it is not required that the second tip tool bit 37 and the second rotatable tool bit 110 are positionally coincide with each other when viewed along the direction of the rotary axis.

During the finishing work, the low hardness portion 29 is continuously cut by the first rotatable tool bit 90, and the high hardness portion 27 is continuously cut by the second rotatable tool bit 110. The low hardness portion 29 that has been cut by the first rotatable tool bit 90 are further cut by the first tip tool bit 35 more precisely, and also the high hardness portion 27 that has been cut by the second rotatable tool bit 110 are further cut by the second tip tool bit 37 more precisely.

As explained above, the low hardness portion 29 is cut by the first tip tool bit 35 after being cut by the first rotatable tool bit 90, and the high hardness portion 27 is cut by the second tip tool bit 37 after being cut by the second rotatable tool bit 110. Generally, a surface cut by a rotatable tool bit becomes rougher than a surface cut by a tip tool bit. But, since the cylinder-bore inner surface 3a after the finishing work in the present embodiment is lastly cut by the first tip tool bit 35 and the second tip tool bit 37, it becomes smoother. As a result, time required for the honing work (the final finishing work) after the finishing work can be shortened.

The above-explained advantages brought by the first and second embodiments can be brought also by the present embodiment similarly. Further, according to the present embodiment, the distance between the first tip tool bit 35 and the first rotatable tool bit 90 along the rotary axis of the boring bar 7 is made identical to the pitch of the depressed portion 13 (the low hardness portion 29). Therefore, the low hardness portion 29 that has been cut by the first rotatable tool bit 90 is further smoothened by the first tip tool bit 35. Similarly, the distance between the second tip tool bit 37 and the second rotatable tool bit 110 is made identical to the pitch of the protruded portion 15 (the high hardness portion 27). Therefore, the high hardness portion 27 that has been cut by the second rotatable tool bit 110 is further smoothened by the second tip tool bit 37.

Note that, also in the third embodiment, it may be possible to continuously cut only the low hardness portion 29 by using a boring bar on which only the first rotatable tool bit 90 and the first tip tool bit 35 are mounted and then continuously cut the high hardness portion 27 by using a boring bar on which only the second rotatable tool bit 110 and the second tip tool bit 37 are mounted. Alternatively, it may be also possible to continuously cut only the high hardness portion 27 by using a boring bar on which only the second rotatable tool bit 110 and the second tip tool bit 37 are mounted and then continuously cut the low hardness portion 29 by using a boring bar on which only the first rotatable tool bit 90 and the first tip tool bit 35 are mounted.

Although the invention has been described above by reference to certain embodiments of the invention, the invention is not limited to the embodiments described above. Scope of the invention should be defined in view of Claims.

The invention claimed is:

1. A method for a finishing work of a spray-coated surface, the method comprising:
    roughening an inner surface of a cylindrical hollow member by forming a helical groove thereon, the helical groove having a helical path;
    forming a thermal spray coating on the inner surface that is roughened; and
    carrying out a finishing work by cutting the thermal spray coating along the helical path of the groove by use of a cutting tool that cuts along the helical path.

2. The method for a finishing work of a spray-coated surface according to claim 1, wherein
    a depressed portion corresponding to the groove and a protruded portion adjacent to the depressed portion are formed by formation of the groove, the depressed portion having the helical path and the protruded portion having a protruded helical path, and,
    in the finishing work, the thermal spray coating is cut along the helical path of the depressed portion by a first cutting tool, and the thermal spray coating is cut along the protruded helical path of the protruded portion by a second cutting tool.

3. The method for a finishing work of a spray-coated surface according to claim 1, wherein
    at least two sets of conditions are made identical to one another among following three sets of conditions: (1) rotating speed, rotating direction, and stroking speed in an axis direction of a tool for forming the groove, (2) rotating speed, rotating direction, and stroking speed in an axis direction of a spray-coating gun for forming the thermal spray coating, or (3) rotating speed, rotating direction, and stroking speed in an axis direction of the cutting tool for the finishing work.

4. The method for a finishing work of a spray-coated surface according to claim 2, wherein
    the first cutting tool is a first rotatable tool bit, and the second cutting tool is a second rotatable tool bit.

5. The method for a finishing work of a spray-coated surface according to claim 4, wherein,
    in the finishing work, a surface that has been cut by the first rotatable tool bit is further cut by a first tip tool bit, and a surface that has been cut by the second rotatable tool bit is further cut by a second tip tool bit.

6. The method for a finishing work of a spray-coated surface according to claim 4, wherein
    at least two sets of conditions are made identical to one another among following three sets of conditions: (1) rotating speed, rotating direction, and stroking speed in an axis direction of a tool for forming the groove, (2) rotating speed, rotating direction, and stroking speed in an axis direction of a spray-coating gun for forming the thermal spray coating, or (3) rotating speed, rotating direction, and stroking speed in an axis direction of the first and second rotatable tool bits for the finishing work.

7. A tool for a finishing work of a spray-coated surface in which the finishing work is carried out by cutting a thermal spray coating formed on an inner surface of a cylindrical hollow member that has been roughened by forming a helical groove thereon and forming a depressed portion corresponding to the groove and a protruded portion adjacent to the depressed portion, the depressed portion having a depressed portion helical path and the protruded portion having a protruded portion helical path, the tool comprising:
a cutting tool that cuts the thermal spray coating; and
a tool support member with which the cutting tool is fixed and that can be stroked, while being rotated, straightly in a direction of a rotary axis thereof, wherein
the cutting tool includes a first cutting tool that cuts the thermal spray coating along the depressed portion helical path, and a second cutting tool that cuts the thermal spray coating along the protruded portion helical path.

8. The tool for a finishing work of a spray-coated surface according to claim 7, wherein
the first cutting tool and the second cutting tool are fixed with the tool support member at positions that are 180-degree separated from each other about the rotary axis.

9. The tool for a finishing work of a spray-coated surface according to claim 7, wherein
the first cutting tool is a CBN tool containing cBN particles not lower than 40% but lower than 90% at volume ratio, and the second cutting tool is a CBN tool containing cBN particles not lower than 85% at volume ratio.

10. The tool for a finishing work of a spray-coated surface according to claim 7, wherein
the first cutting tool is a first rotatable tool bit, and the second cutting tool is a second rotatable tool bit.

11. The tool for a finishing work of a spray-coated surface according to claim 10, wherein
the first rotatable tool bit and the second rotatable tool bit are fixed with the tool support member at positions that are 180-degree separated from each other about the rotary axis.

12. The tool for a finishing work of a spray-coated surface according to claim 10, further comprising
a first tip tool bit that further cuts a surface that has been cut by the first rotatable tool bit, and a second tip tool bit that further cuts a surface that has been cut by the second rotatable tool bit.

13. The tool for a finishing work of a spray-coated surface according to claim 12, wherein
the first tip tool bit is mounted on the tool support member at a position distanced from the first rotatable tool bit along a direction of the rotary axis by a helical pitch of the groove, and
the second tip tool bit is mounted on the tool support member at a position distanced from the second rotatable tool bit along a direction of the rotary axis by a helical pitch of the groove.

14. The tool for a finishing work of a spray-coated surface according to claim 10, wherein
the first rotatable tool bit is a CBN tool containing cBN particles not lower than 40% but lower than 90% at volume ratio, and the second rotatable tool bit is a CBN tool containing cBN particles not lower than 85% at volume ratio.

* * * * *